(12) United States Patent
Lee et al.

(10) Patent No.: US 11,169,695 B2
(45) Date of Patent: Nov. 9, 2021

(54) METHOD FOR PROCESSING DYNAMIC IMAGE AND ELECTRONIC DEVICE THEREOF

(71) Applicant: Samsung Electronics Co., Ltd., Gyeonggi-do (KR)

(72) Inventors: Hyungdo Lee, Gyeonggi-do (KR); Minwook Na, Gyeonggi-do (KR); Hyewon Park, Gyeonggi-do (KR); Hyunmi Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 61 days.

(21) Appl. No.: 16/535,411

(22) Filed: Aug. 8, 2019

(65) Prior Publication Data
US 2020/0050357 A1   Feb. 13, 2020

(30) Foreign Application Priority Data

Aug. 8, 2018   (KR) .......................... 10-2018-0092653

(51) Int. Cl.
| | |
|---|---|
| *G06F 3/0488* | (2013.01) |
| *G06F 3/0484* | (2013.01) |
| *G11B 27/036* | (2006.01) |
| *G11B 27/00* | (2006.01) |
| *H04N 9/87* | (2006.01) |

(52) U.S. Cl.
CPC ...... *G06F 3/04883* (2013.01); *G06F 3/04845* (2013.01); *G11B 27/005* (2013.01); *G11B 27/036* (2013.01); *H04N 9/8715* (2013.01)

(58) Field of Classification Search
None
See application file for complete search history.

(56) References Cited

U.S. PATENT DOCUMENTS

| | | | |
|---|---|---|---|
| 9,524,651 B2 * | 12/2016 | Fix ........................... | G09B 5/12 |
| 9,703,456 B2 | 6/2017 | Park | |
| 10,402,086 B2 | 9/2019 | Hwang et al. | |
| 2009/0327856 A1 | 12/2009 | Mouilleseaux et al. | |

(Continued)

FOREIGN PATENT DOCUMENTS

| | | |
|---|---|---|
| JP | 2016-110676 | 6/2016 |
| KR | 20100074968 | 7/2010 |

(Continued)

OTHER PUBLICATIONS

International Search Report dated Dec. 5, 2019 issued in counterpart application No. PCT/KR2019/010026, 7 pages.

(Continued)

*Primary Examiner* — Henry Orr
(74) *Attorney, Agent, or Firm* — The Farrell Law Firm, P.C.

(57) ABSTRACT

An electronic device includes a display, at least one processor, and a memory operatively connected to the at least one processor, wherein the memory stores instructions that cause, when executed, the at least one processor to display a dynamic image in a stopped state; receive a drag input onto an area in which the dynamic image is displayed in the stopped state; and display a path of the drag input superimposed on the dynamic image, which has been switched from the stopped state to a playback state, while the drag input remains in contact with the display.

16 Claims, 11 Drawing Sheets

(56) References Cited

U.S. PATENT DOCUMENTS

| | | | |
|---|---|---|---|
| 2012/0064947 A1 | 3/2012 | Yi et al. | |
| 2013/0263002 A1 | 10/2013 | Park | |
| 2014/0143725 A1* | 5/2014 | Lee | G06F 3/0483 |
| | | | 715/834 |
| 2014/0195947 A1* | 7/2014 | Yang | H04N 5/23296 |
| | | | 715/769 |
| 2015/0003803 A1 | 1/2015 | Lee et al. | |
| 2016/0299648 A1* | 10/2016 | Migos | G06F 3/0483 |

FOREIGN PATENT DOCUMENTS

| | | |
|---|---|---|
| KR | 1020120026395 | 3/2012 |
| KR | 10-1647720 | 8/2016 |
| KR | 1020170083107 | 7/2017 |
| WO | WO 2016/076464 | 5/2016 |

OTHER PUBLICATIONS

European Search Report dated Dec. 12, 2019 issued in counterpart application No. 19190814.4-1209, 6 pages.

* cited by examiner

METHOD FOR PROCESSING DYNAMIC IMAGE AND ELECTRONIC DEVICE THEREOF

CROSS-REFERENCE TO RELATED APPLICATION(S)

This application is based on and claims priority under 35 U.S.C. § 119 to Korean Patent Application No. 10-2018-0092653, filed on Aug. 8, 2018, in the Korean Intellectual Property Office, the disclosure of which is incorporated by reference herein in its entirety.

BACKGROUND

1. Field

The present disclosure relates generally to a method for processing dynamic images and an electronic device therefor.

2. Description of Related Art

Electronic devices have been implemented as multimedia players having complex functions such as photographing, video-shooting, reproducing music or video files, gaming, and reception of a broadcast.

An electronic device may provide images to a user through a display, and the user may add a variety of information (e.g., comments) to the images. Users of electronic devices may easily generate and share dynamic images, as well as still images, using electronic devices.

Accordingly, there is an increasing need for a technique that enables the user to input desired information into the dynamic images and the still images. In the case where the user inputs information into the dynamic image, the electronic device may require a solution necessary to process the dynamic image in association with the information input by the user.

SUMMARY

The present disclosure has been made to address the above-mentioned problems and disadvantages, and to provide at least the advantages described below In accordance with an aspect of the present disclosure, an electronic device includes a display, at least one processor, and a memory operatively connected to the at least one processor, wherein the memory stores instructions that allow, when executed, the at least one processor to display a dynamic image in a stopped state, receive a drag input on an area in which the dynamic image is displayed in the stopped state, and display a path of the drag input superimposed on the dynamic image, which has been switched from the stopped state to a playback state, while the drag input remains in contact with the display.

In accordance with another aspect of the present disclosure, an electronic device includes a display, at least one processor, and a memory operatively connected to the at least one processor, wherein the memory stores instructions that cause, when executed, the processor to display a dynamic image in a playback state, receive a drag input on an area in which the dynamic image is displayed in the playback state, and display a path of the drag input superimposed on the dynamic image, which has been switched from the playback state to a stopped state, while the drag input remains in contact with the display.

In accordance with another aspect of the present disclosure, a method for processing a dynamic image in an electronic device includes displaying a dynamic image in a stopped state, receiving a drag input on an area in which the dynamic image is displayed in the stopped state, and displaying a path of the drag input superimposed on the dynamic image, which has been switched from the stopped state to a playback state, while the drag input remains in contact with a display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
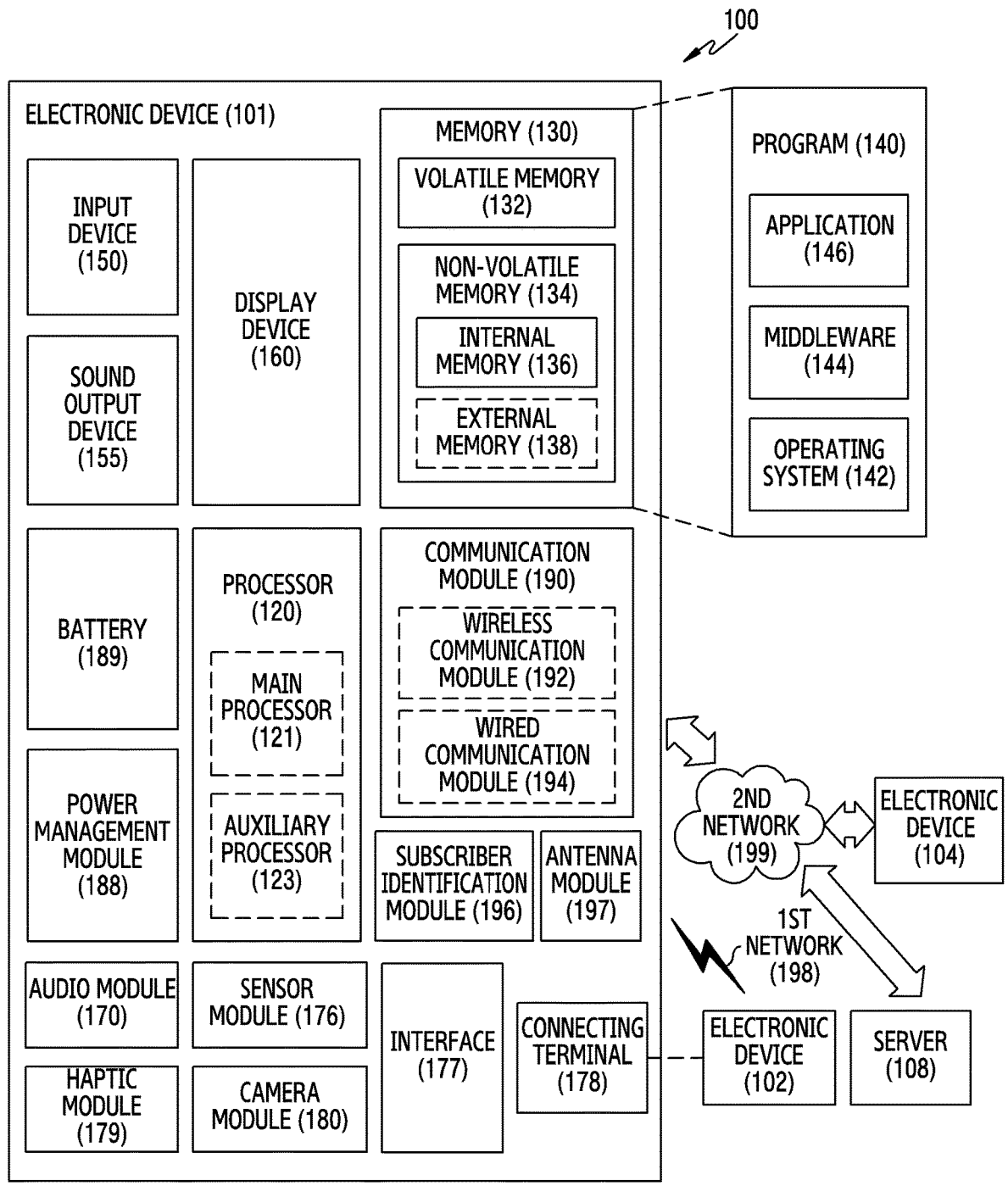
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (TMST)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, an electronic device may include a display, at least one processor, and a memory operatively connected to the at least one processor, wherein the memory may store instructions that cause (i.e., allow), when executed, the at least one processor to display a dynamic image in a stopped state, receive a drag input on an area in which the dynamic image is displayed in the stopped state, and display a path of the drag input superimposed on the dynamic image, which has been switched from the stopped state to a playback state, while the drag input remains in contact with the display.

The instructions may cause the at least one processor to restore the dynamic image to the stopped state in response to an operation of identifying that the drag input is released.

The instructions may cause the at least one processor to display the dynamic image in the stopped state along with at least one object for controlling the dynamic image, and deactivate the at least one object while the drag input remains in contact with the display.

The instructions may cause the at least one processor to activate the at least one deactivated object in response to an operation of identifying that the drag input is released.

The instructions may cause the at least one processor to deactivate the at least one object by stopping displaying the at least one object.

The instructions may cause the at least one processor to store the dynamic image displaying the path of the drag input, which is superimposed on the dynamic image, for a reproduction period in which the drag input remains in contact with the display, among an entire reproduction period of the dynamic image.

The electronic device may further include a communication circuit, and the instructions may cause the at least one processor to transmit the stored dynamic image to another electronic device using the communication circuit.

The instructions may cause the at least one processor to, in response to an operation of identifying that the drag input is released, determine whether or not another drag input is received after the drag input is released before a predetermined period of time elapses, and if another drag input is received before the predetermined period of time elapses, display a path of another drag input superimposed on the dynamic image displayed in the playback state while another drag input remains in contact with the display.

A reproduction speed of the dynamic image in the playback state may correspond to a speed of the drag input.

The instructions may cause the at least one processor to, in response to an operation of identifying that the drag input is released, restore the dynamic image to the stopped state, identify text corresponding to the path of the drag input, and change the path of the drag input superimposed on the dynamic image displayed in the stopped state to the text.

According to various embodiments, an electronic device may include a display, at least one processor, and a memory operatively connected to the at least one processor, wherein the memory may store instructions that cause, when executed, the at least one processor to display a dynamic image in a playback state, receive a drag input on an area in which the dynamic image is displayed in the playback state, and display a path of the drag input superimposed on the dynamic image, which has been switched from the playback state to a stopped state, while the drag input remains in contact with the display.

The instructions may cause the at least one processor to restore the dynamic image to the playback state in response to an operation of identifying that the drag input is released.

Figure 2:
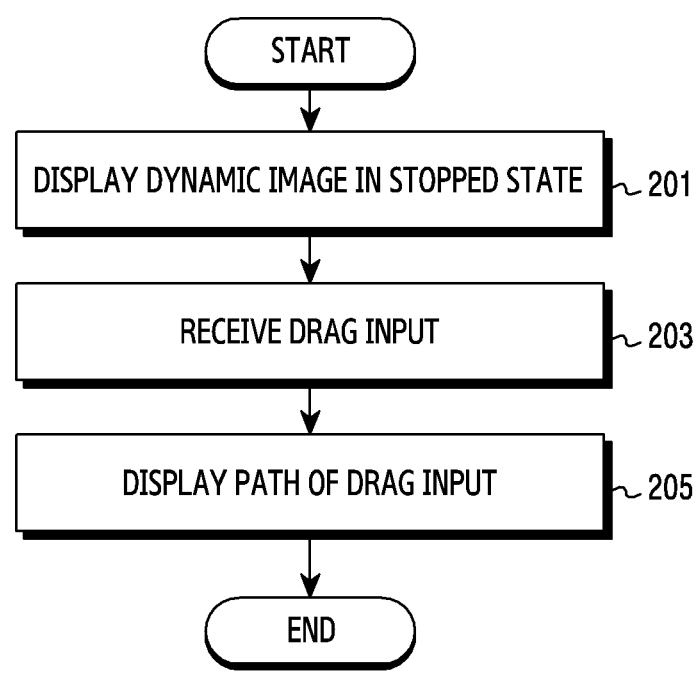
FIG. 2 is a flowchart illustrating a method for processing dynamic images in an electronic device, according to an embodiment.

FIG. 2 is a flowchart illustrating a method for processing dynamic images in an electronic device, according to an embodiment.

Figure 3:
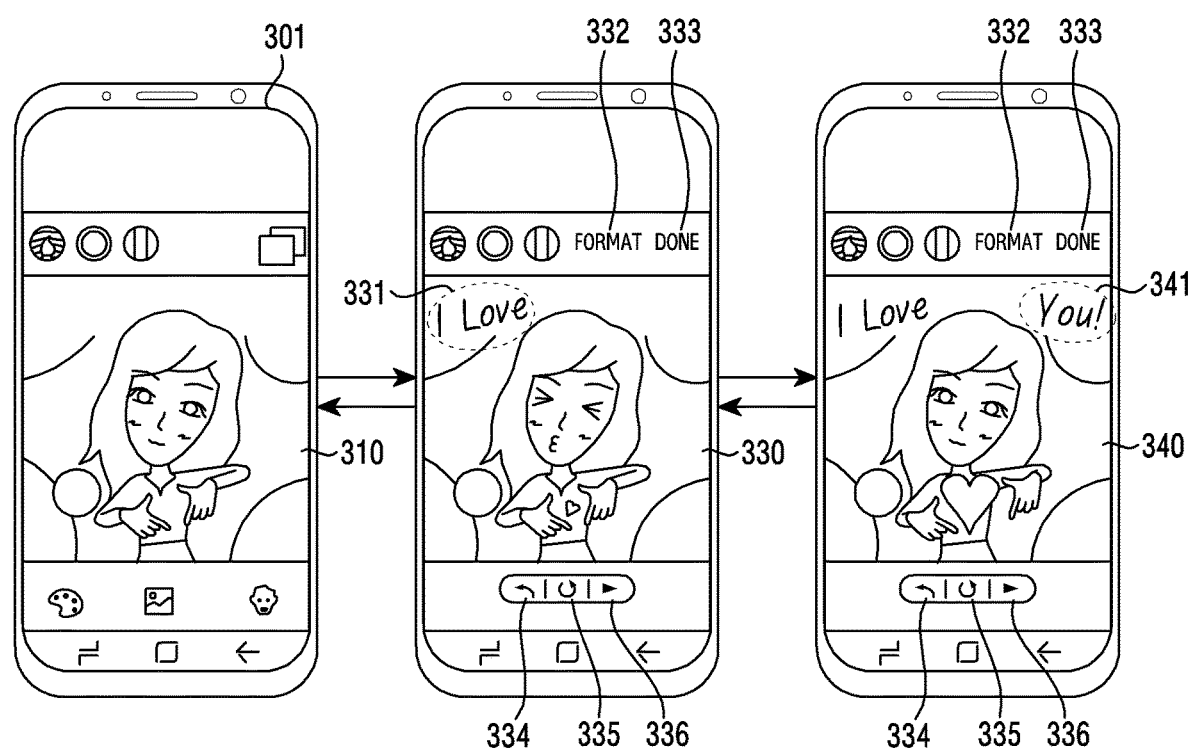
FIG. 3 is a diagram illustrating a method for processing dynamic images in an electronic device, according to an embodiment.

FIG. 3 is a diagram illustrating a method for processing dynamic images in an electronic device, according to an embodiment.

Referring to FIGS. 2-3, a processor 120 of an electronic device 101 displays a dynamic image in a stopped state in step 201. For example, the processor 120 may execute an application (e.g., a photographing application, a messaging application, or a media application) that provides a dynamic image on the basis of a user input. The processor 120 may display one or more dynamic images in a stopped state through a display 160 (i.e., display device) on the basis of execution of the application providing the dynamic images.

The processor 120 may display, using a photographing application, one or more dynamic images (e.g., videos) stored in the electronic device 101 or an external electronic device (e.g., the server 108) in a thumbnail format, and may display one dynamic image in a stopped state, which is selected by the user from among the dynamic images.

The processor 120 may display a list of one or more dynamic images (e.g., movies and dramas) stored in the electronic device 101 or obtained from an external electronic device through a media application, and may display one dynamic image in a stopped state, which is selected by the user from the list.

The processor 120 may display a dynamic image 310 on the background of a message (e.g., a message background image) in a stopped state through a messaging application, as shown in FIG. 3. In this case, the dynamic image 310 may be an image selected on the basis of a user input from among the images stored in the electronic device 101 or provided by the messaging application.

In step 203, the processor 120 receives a drag input on the area in which the dynamic image is displayed in the stopped state. For example, the processor 120 may receive a drag input that is input onto the dynamic image 310 displayed in the stopped state, as shown in FIG. 3.

The drag input may be performed through at least one of a touch or an electronic pen. The processor 120 may switch the dynamic image from the stopped state to a playback state while the drag input remains in contact with the display (or while the drag input is received in the area in which the dynamic image is displayed in the stopped state).

The processor 120 may deactivate at least one object displayed on the display while the drag input remains in contact with the display. For example, even if a finger or pen of the drag input touches at least one object displayed on the display while the drag input remains in contact with the display, the processor 120 may not perform the function corresponding to the touched object. Additionally or alternatively, the processor 120 may stop displaying at least one object while the drag input remains in contact with the area in which the dynamic image is displayed in the stopped state.

In step 205, the processor 120 displays, on the display, a path of the drag input superimposed on the dynamic image that has been switched from the stopped state to the playback state. For example, the processor 120 may display a path 331 of the drag input on the dynamic image 330 that has been switched from the stopped state to the playback state through the display while the drag input remains in contact with the display, as shown in FIG. 3. Additionally or alternatively, the processor 120 may display a path 331 of the drag input on the dynamic image 330 that has been switched from the stopped state to the playback state through the display while the drag input remains in contact with the display. Thereafter, if the drag input is released, the processor 120 may identify the text corresponding to the path 331 of the drag input, and may change the path 331 of the drag input into the identified text, thereby displaying the same.

The processor may display the dynamic image 330 on a first layer, and may display the path 331 of the drag input on a second layer overlaid on the first layer. The dynamic image that has been switched from the stopped state to the playback state may be reproduced at a predefined speed or at a speed corresponding to the speed of the drag input while the drag input remains in contact with the display. For example, the dynamic image may be reproduced at a predefined speed, regardless of the movement speed of the drag input. Additionally or alternatively, the dynamic image may be reproduced in proportion to the speed of the drag input.

If the path 331 of the drag input is displayed on the dynamic image 330, the processor 120 may display a plurality of objects for editing and storing at least a portion of the path 331 of the drag input (e.g., a first object 332, a second object 333, a third object 334, a fourth object 335, and a fifth object 336).

The first object 332 may provide a function of selecting a file format of the dynamic image (e.g., graphics interchange format (GIF) or Motion Picture Experts Group (MPEG)-4 (MP4) format). The second object 333 may provide a function of storing the dynamic image 330 displaying the path 331 of the drag input thereon. The third object 334 may provide a function of removing at least a portion of the path 331 of the drag input from the dynamic image 330. The fourth object 335 may provide a function of initializing the dynamic image 330 by removing the whole path 331 of the drag input from the dynamic image 330. The fifth object 336 may provide a function of sequentially reproducing the paths of the drag inputs based on the input order (or time). If the drag input is released, or if a predetermined time has elapsed since the drag input was released, the processor 120 may restore the dynamic image from the playback state to the stopped state.

The user of the electronic device may perform a drag input for some of the reproduction period of the dynamic image, thereby adding a variety of information to the images corresponding thereto, through steps 203 to 205 in FIG. 2. For example, if the dynamic image corresponding to a specific period, to which the user wishes to add information, is reproduced during the reproduction of the dynamic image, the user of the electronic device may stop the reproduction of the dynamic image, and may add information to the stopped dynamic image by means of a drag input.

Figure 4:
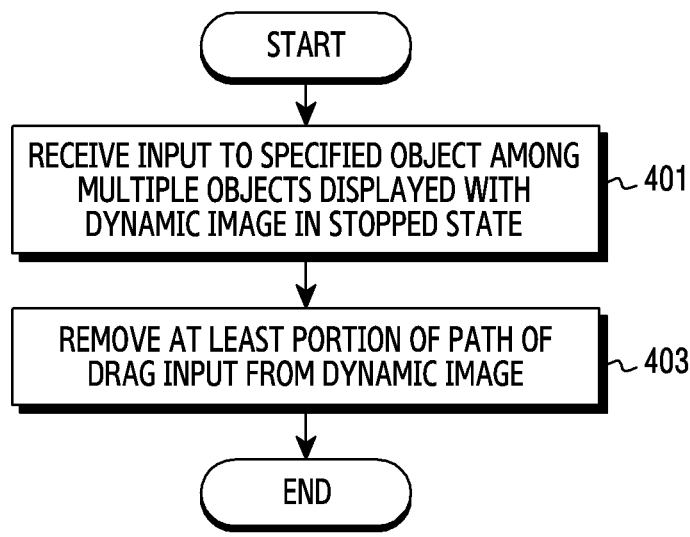
FIG. 4 is a flowchart illustrating a method for removing a path of a drag input from a dynamic image in an electronic device, according to an embodiment.

FIG. 4 is a flowchart illustrating a method for removing a path of a drag input from a dynamic image in an electronic device, according to an embodiment. The following description may correspond to an operation performed after step 205 in FIG. 2.

Referring to FIG. 4, in step 401, a processor 120 of an electronic device 101 receives an input with respect to a specified object, among a plurality of objects displayed when the dynamic image is switched from the playback state to the stopped state. For example, as shown in FIG. 3, the processor 120 may receive an input with respect to the third object 334 that provides a function of removing at least a portion of the path 331 of the drag input from the dynamic image 330, or may receive an input with respect to the fourth object 335 that provides a function of initializing the dynamic image by removing the entire path 331 of the drag input from the dynamic image 330, among the plurality of objects 332 to 336 displayed along with the dynamic image 330 in the stopped state. The plurality of objects may be continuously displayed until the time at which an input with respect to the second object 333 providing a function of storing the dynamic image 330 displaying the path 331 of the drag input is received, or until the time at which the amount of data of the path 331 of the drag input amounts to a reference value.

In step 403, the processor 120 removes at least a portion of the path of the drag input from the dynamic image on the basis of an input to a specified object. For example, if an input with respect to the third object 334 is received while the path 331 of the drag input is displayed on the dynamic image 330, as shown in FIG. 3, the processor 120 may remove, from the dynamic image, the path of the drag input (e.g., "e") which was generated by a last stroke, among the path 331 of the drag input (e.g., "I Love"). The processor 120 may convert the current dynamic image 330 into a previous dynamic image in which the path of the drag input generated by means of the last stroke is not displayed, thereby displaying the converted dynamic image. Additionally or alternatively, if an input with respect to the fourth object 335 is received while the path 331 of the drag input is displayed on the dynamic image 330, as shown in FIG. 3, the processor 120 may remove the entire path 331 of the drag input, and may convert the current dynamic image 330 into a previous dynamic image 310 in which the path 331 of the drag input is not displayed, thereby displaying the converted dynamic image.

Figure 5:
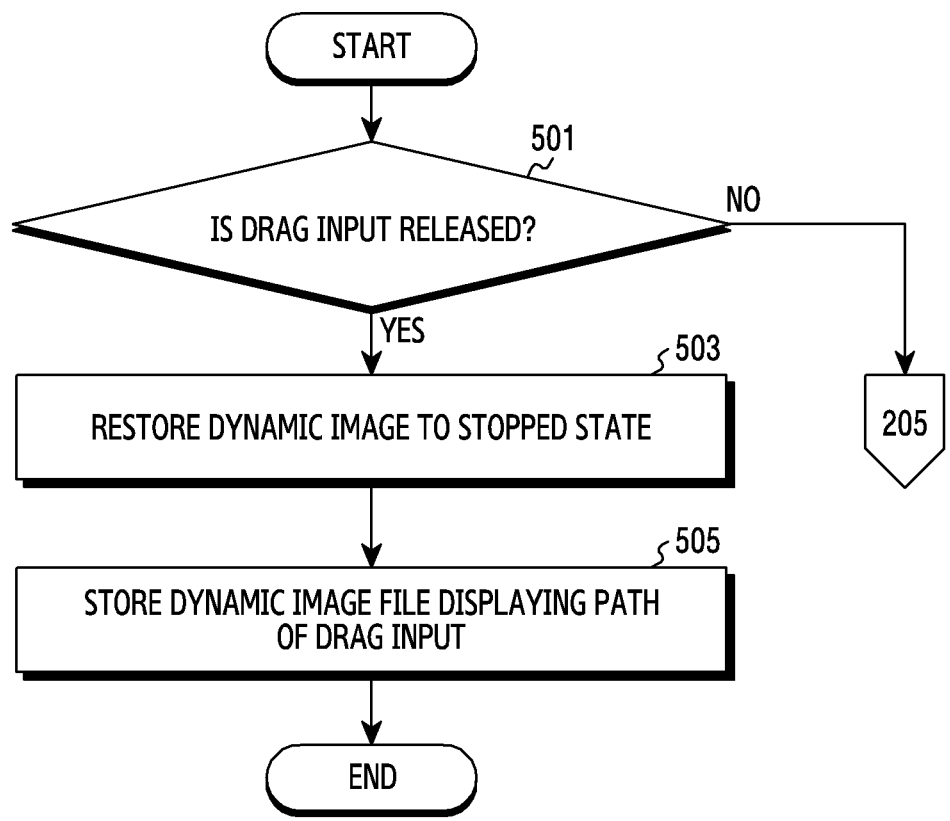
FIG. 5 is a flowchart illustrating a method for storing a dynamic image file displaying a path of a drag input in an electronic device, according to an embodiment.

FIG. 5 is a flowchart illustrating a method for storing a dynamic image file displaying a path of a drag input in an electronic device, according to an embodiment. The following description may correspond to an operation performed after step 205 in FIG. 2.

Referring to FIG. 5, in step 501, a processor 120 of an electronic device 101 determines whether or not the drag input is released from the dynamic image in the playback state. If the drag input is released from the dynamic image in the playback state, the processor 120 performs steps 503 to 505. If the drag input is not released from the dynamic image in the playback state, the processor 120 displays a path of the drag input so as to be superimposed on the dynamic image in the playback state as provided by step 205 in FIG. 2.

If the drag input is released from the dynamic image in the playback state, the processor 120 restores the dynamic image to a stopped state in step 503. For example, the processor 120 may switch the dynamic image from the playback state to a stopped state, and may then display the same at the time at which the drag input is released from the dynamic image in the playback state. The dynamic image switched from the playback state to the stopped state may contain the path of the drag input.

In step 505, the processor 120 stores the dynamic image displaying the path of the drag input. For example, if an input with respect to the second object 333 providing a function of storing the dynamic image 330 displaying the path 331 of the drag input is received, as shown in FIG. 3, the processor 120 may store the dynamic image 330 displaying the path 331 of the drag input. Additionally or alternatively, if an amount of data of the path 331 of the drag input is greater than or equal to a reference value, the processor 120 may automatically store the dynamic image 330 displaying the path 331 of the drag input.

The processor 120 may store the dynamic image 330 displaying the path 331 of the drag input as a separate file from the original file of the dynamic image, as shown in FIG. 3, or may update the dynamic image 310 of the original file with the dynamic image 330 displaying the path 331 of the drag input, and may then store the same. The processor 120 may perform text recognition for the path 331 of the drag input, may determine text corresponding to the path 331 of the drag input, and may use the determined text as a file name of the dynamic image 330 displaying the path 331 of the drag input.

After storing the dynamic image 330 displaying the path 331 of the drag input, the processor 120 may transmit the stored dynamic image 330 to an external electronic device (e.g., the electronic device 104) through a communication module 190.

Figure 6:
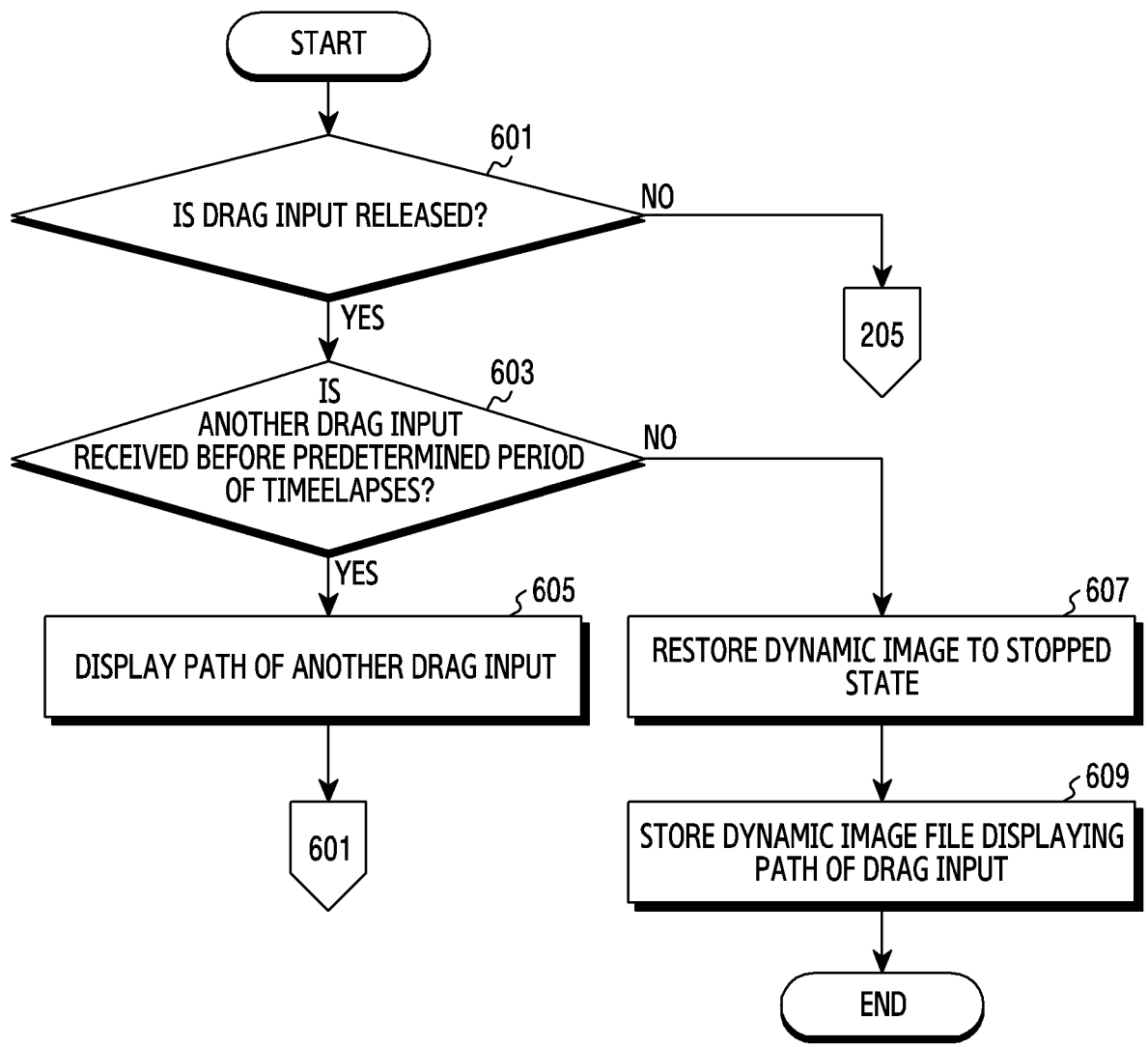
FIG. 6 is a flowchart illustrating a method for storing a dynamic image file displaying a path of a drag input in an electronic device, according to an embodiment.

FIG. 6 is a flowchart illustrating a method for storing a dynamic image file displaying a path of a drag input in an electronic device, according to an embodiment. The following description may correspond to an operation performed after step 205 in FIG. 2.

Referring to FIG. 6, in step 601, a processor 120 of an electronic device 101 determines whether or not the drag input is released from the dynamic image, which is in the playback state. If the drag input is released from the dynamic image in the playback state, the processor 120 performs steps 603 to 605. If the drag input is not released from the dynamic image in the playback state, the processor 120 displays a path of the drag input on the dynamic image in the playback state as step 205 in FIG. 2.

If the drag input is released from the dynamic image in the playback state, the processor 120 determines whether or not another drag input is received before a specified period of time (e.g., 10 seconds) elapses in step 603. The processor 120 may maintain the playback state of the dynamic image after the time at which the drag input is released and before a specified period of time elapses, or may switch the dynamic image from the playback state to the stopped state at the time at which the drag input is released, and may then display the switched dynamic image. If another drag input is received after the time at which the drag input is released and before a specified period of time elapses, the processor 120 performs step 605. If another drag input is not received before a specified period of time elapses, the processor 120 performs steps 607 to 609.

If another drag input is received before a specified period of time elapses, the processor 120 displays a path of another drag input in step 605. For example, if the drag input is released while the dynamic image 330 displaying the path 331 of the drag input is displayed, as shown in FIG. 3, and if another drag input is received within a specified period of time, the processor 120 may display a path 341 of another drag input superimposed on the dynamic image 340 in the playback state. If the path 341 of another drag input is displayed, the processor 120 may perform step 601 again in order to determine whether or not the drag input is released.

If another drag input is not received before a specified period of time elapses, the processor 120 restores the dynamic image to the stopped state in step 607. For example, the processor 120 may switch the dynamic image from the playback state to the stopped state, thereby displaying the switched dynamic image at the time at which a specified period of time elapsed since the drag input is released from the dynamic image in the playback state. The dynamic image switched from the playback state to the stopped state may include the paths of the drag inputs.

In step 609, the processor 120 stores the dynamic image displaying the paths of the drag inputs. For example, if an input with respect to the second object 333 providing a function of storing the dynamic image 330 displaying the path 331 of the drag input is received, as shown in FIG. 3, the processor 120 may store the dynamic image 330 displaying the path 331 of the drag input. Additionally or alternatively, if the amount of data of the path 331 of the drag input is greater than or equal to a reference value, the processor 120 may automatically store the dynamic image 330 displaying the path 331 of the drag input. The processor 120 may store the dynamic image 330 displaying the path 331 of the drag input as a separate file from the original file of the dynamic image, as shown in FIG. 3, or may update the dynamic image 310 of the original file with the dynamic image 330 displaying the path 331 of the drag input, thereby storing the same. The processor 120 may perform text recognition for the path 331 of the drag input, may determine text corresponding to the path 331 of the drag input, and may use the determined text as a file name of the dynamic image 330 displaying the path 331 of the drag input.

After storing the dynamic image 330 displaying the path 331 of the drag input, the processor 120 may transmit the stored dynamic image 330 to an external electronic device (e.g., the electronic device 104) through a communication module 190.

Figure 7:
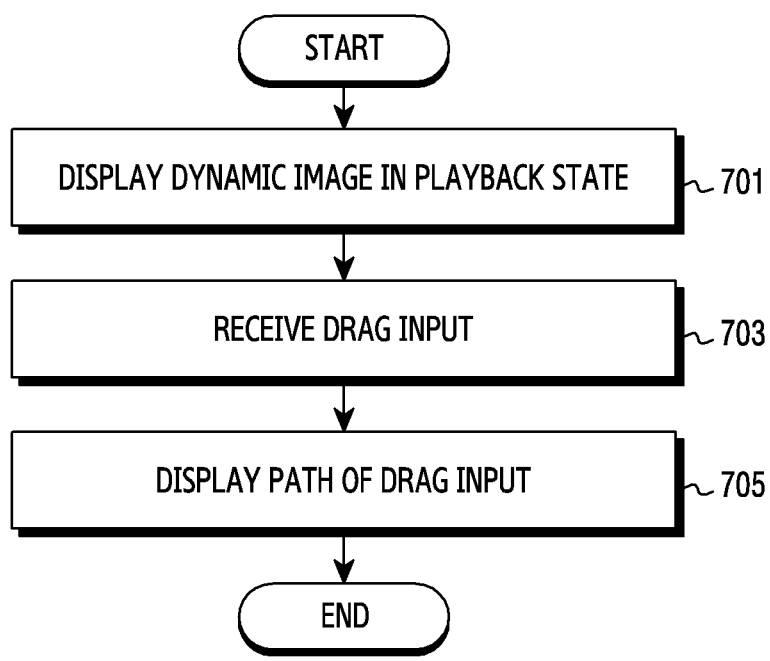
FIG. 7 is a flowchart illustrating a method for processing a dynamic image in an electronic device, according to an embodiment.

FIG. 7 is a flowchart illustrating a method for processing a dynamic image in an electronic device, according to an embodiment.

Figure 8:
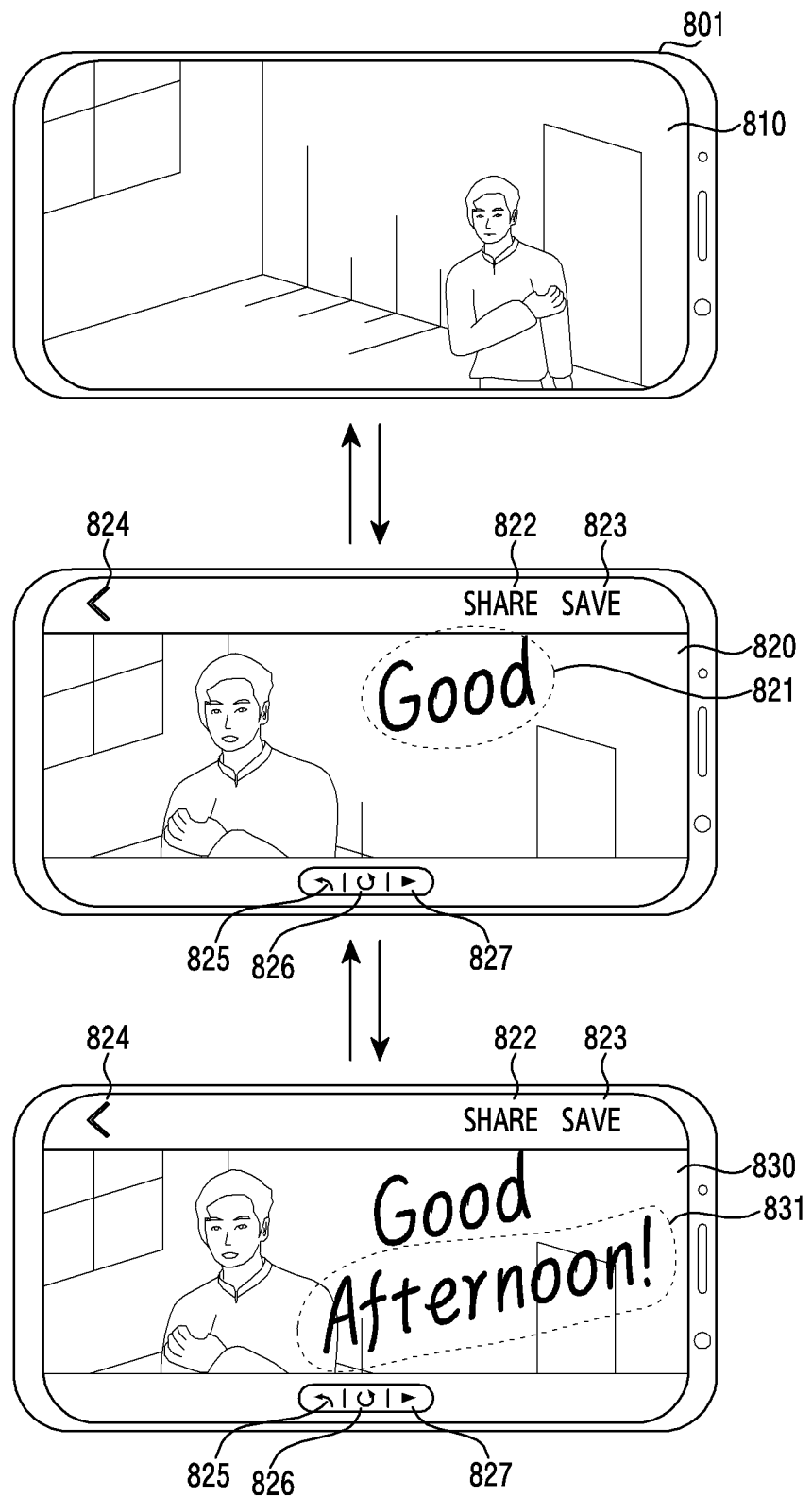
FIG. 8 is a diagram illustrating a method for processing a dynamic image in an electronic device, according to an embodiment.

FIG. 8 is a diagram illustrating a method for processing a dynamic image in an electronic device, according to an embodiment.

Referring to FIGS. 7 and 8, a processor 120 of an electronic device 101 displays a dynamic image in a playback state in step 701. The processor 120 may execute an application (e.g., a photographing application or a media application) that provides a dynamic image on the basis of a user input. The processor 120 may display one or more dynamic images in a playback state through a display 160 on the basis of the execution of the application providing the dynamic images. For example, the processor 120 may display, using a photographing application, one or more dynamic images (e.g., videos) stored in the electronic device 101 or an external electronic device (e.g., the server 108) in the form of thumbnails, and may display one dynamic image in a playback state on the basis of an input for reproducing one of the dynamic images displayed in the form of thumbnails. Additionally or alternatively, the processor 120 may display a list of one or more dynamic images (e.g., movies and dramas) stored in the electronic device 101 or obtained from an external electronic device (e.g., the server 108) through a media application, and may display one dynamic image 801 in a playback state on the basis of an input for reproducing one of the dynamic images, as shown in FIG. 8.

In step 703, the processor 120 receives a drag input on the area in which the dynamic image is displayed in the playback state. For example, the processor 120 may receive a drag input performed on the dynamic image 810 displayed in the playback state, as shown in FIG. 8. The drag input may be conducted by means of at least one of a touch or an electronic pen. The processor 120 may switch the dynamic image from the playback state to a stopped state while the drag input remains in contact with the display (or while the drag input is maintained on the area in which the dynamic image is displayed in the playback state). The processor 120 may deactivate at least one object displayed on the display while the drag input remains in contact with the display. For example, even if a finger or pen of the drag input touches at least one object displayed on the display while the drag input remains in contact with the display, the processor 120 may not perform the function corresponding to the touched object. Additionally or alternatively, the processor 120 may stop displaying at least one object while the drag input remains in contact with the area in which the dynamic image is displayed in the stopped state.

In step 705, the processor 120 displays, on the display, a path of the drag input superimposed on the dynamic image that has been switched from the playback state to the stopped state. For example, the processor 120 may display, on the display, a path 821 of a drag input on a dynamic image 820 that has been switched from a playback state to a stopped state while the drag input remains in contact with the display, as shown in FIG. 8. Additionally or alternatively, the processor 120 may display, on the display, the path 821 of the drag input on the dynamic image 820 that has been switched from the playback state to the stopped state while the drag input remains in contact with the display. Thereafter, if the drag input is released, the processor 120 may identify text corresponding to the path 821 of the drag input, and may change the path 821 of the drag input into the identified text, thereby displaying the same.

The processor may display the dynamic image 820 on a first layer, and may display the path 821 of the drag input on a second layer overlaid on the first layer. If the path 821 of the drag input is displayed on the dynamic image 820, the processor 120 may display a plurality of objects for editing and storing at least a portion of the path 821 of the drag input (e.g., a first object 822, a second object 823, a third object 824, a fourth object 825, a fifth object 826, and a sixth object 827), as shown in FIG. 8.

The first object 822 may provide a function of sharing the path 821 of the drag input or the dynamic image 820 displaying the path 821 of the drag input with an external electronic device (e.g., the electronic device 104). The second object 823 may provide a function of storing the dynamic image 820 displaying the path 821 of the drag input. The third object 824 may provide a function of stopping displaying at least some of the plurality of objects, which are displayed along with the dynamic image 820. The fourth object 825 may provide a function of removing at least a portion of the path 821 of the drag input from the dynamic image 820. The fifth object 826 may provide a function of initializing the dynamic image 820 by removing the entire path 821 of the drag input from the dynamic image 820. The sixth object 827 may provide a function of sequentially reproducing the paths of the drag inputs based on the input order (or time). If the drag input is released, or if a predetermined time has elapsed since the drag input was released, the processor 120 may restore the dynamic image from the stopped state to the playback state.

The user of the electronic device may perform a drag input with respect to some of the entire reproduction period of the dynamic image, thereby adding a variety of information to the images corresponding thereto, through steps 703 to 705 in FIG. 7. For example, the user of the electronic device may add information to the dynamic image corresponding to a specific period, to which the user wishes to add information, by means of a drag input.

Figure 9:
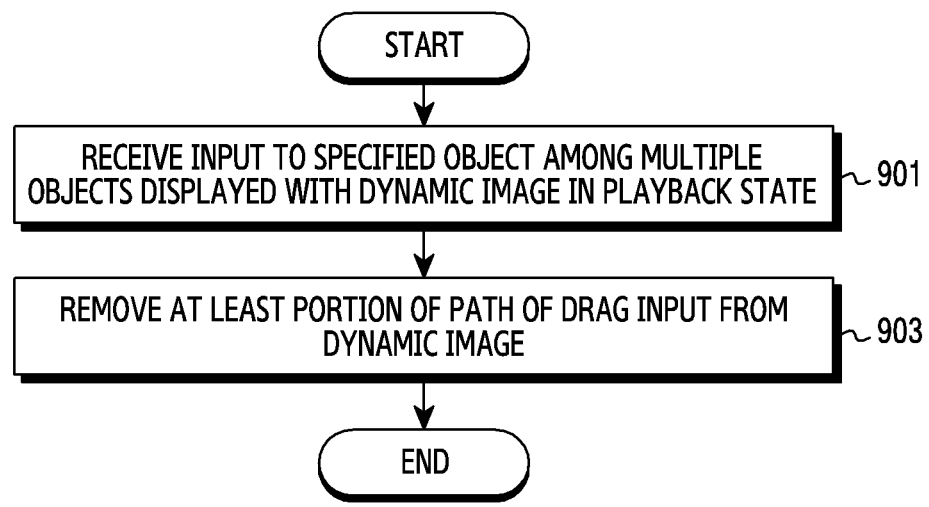
FIG. 9 is a flowchart illustrating a method for removing a path of a drag input from a dynamic image in an electronic device, according to an embodiment.

FIG. 9 is a flowchart illustrating a method for removing a path of a drag input from a dynamic image in an electronic device, according to an embodiment.

The following description may correspond to an operation performed after step 705 in FIG. 7.

Referring to FIG. 9, in step 901, a processor 120 of an electronic device 101 receives an input with respect to a specified object, among a plurality of objects displayed when the dynamic image is switched from the playback state to the stopped state. As shown in FIG. 8, the processor 120 may receive an input with respect to the fourth object 825 that provides a function of removing at least a portion of the path 821 of the drag input from the dynamic image 820, or may receive an input with respect to the fifth object 826 that provides a function of initializing the dynamic image 820 by removing the path 821 of the drag input from the dynamic image 820. The plurality of objects may be displayed until the time at which an input with respect to the second object 823 providing a function of storing the dynamic image 820 displaying the path 821 of the drag input is received or until the time at which the amount of data of the path 821 of the drag input is greater than or equal to a reference value.

In step 903, the processor 120 removes at least a portion of the path of the drag input from the dynamic image on the basis of an input to a specified object. For example, if an input with respect to the fourth object 825 is received while the path 821 of the drag input is displayed on the dynamic image 820, as shown in FIG. 8, the processor 120 may remove, from the dynamic image 820, the path of the drag input (e.g., "d"), which was generated by a last stroke, among the path 821 of the drag input (e.g., "Good"), and may convert the current dynamic image 820 into a previous dynamic image in which the path of the drag input generated by the last stroke is not displayed, thereby displaying the converted dynamic image. Additionally or alternatively, if an input with respect to the fifth object 826 is received while the path 821 of the drag input is displayed on the dynamic image 820, as shown in FIG. 8, the processor 120 may remove the entire path 821 of the drag input, and may convert the current dynamic image 820 into a previous dynamic image 810 in which the path 821 of the drag input is not displayed, thereby displaying the converted dynamic image.

Figure 10:
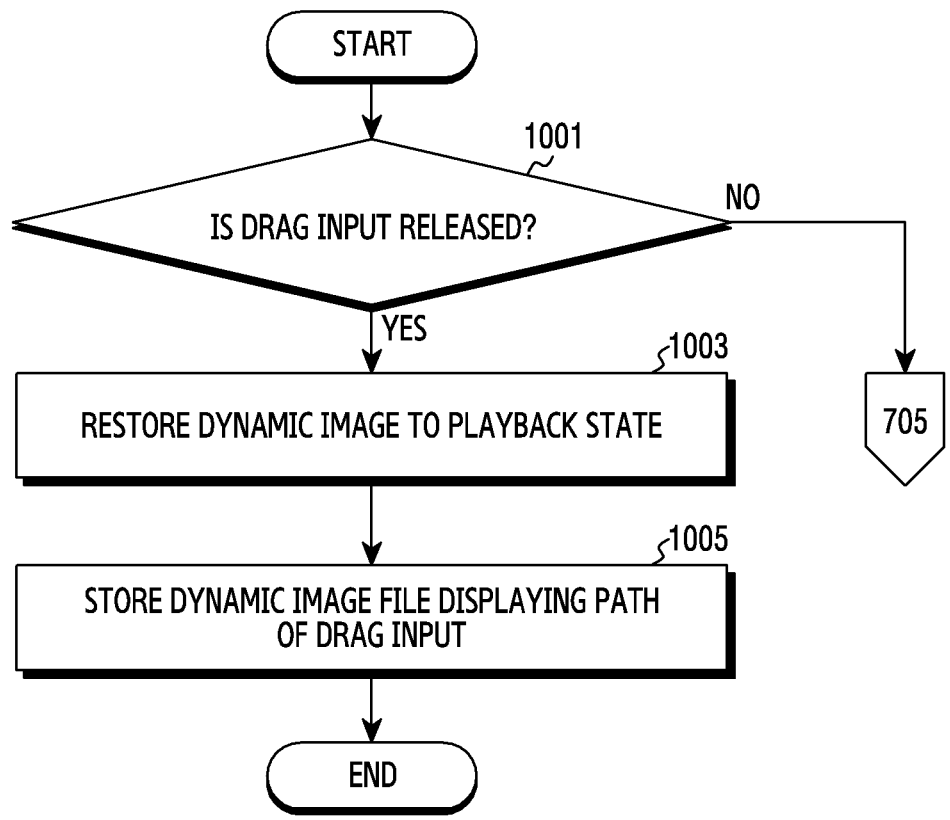
FIG. 10 is a flowchart illustrating a method for storing a dynamic image file displaying a path of a drag input in an electronic device, according to an embodiment.

FIG. 10 is a flowchart illustrating a method for storing a dynamic image file displaying a path of a drag input in an electronic device, according to an embodiment. The following description may correspond to an operation performed after step 705 in FIG. 7.

Referring to FIG. 10, in step 1001, a processor 120 of an electronic device 101 determines whether or not the drag input is released from the dynamic image, which is in the stopped state. If the drag input is released from the dynamic image in the stopped state, the processor 120 performs steps 1003 to 1005. If the drag input is not released from the dynamic image in the stopped state, the processor 120 displays a path of the drag input superimposed on the dynamic image in the stopped state as step 705 in FIG. 7.

If the drag input is released from the dynamic image in the stopped state, the processor 120 restores the dynamic image to a playback state in step 1003. For example, the processor 120 may switch the dynamic image from the stopped state to a playback state at the time at which the drag input is released from the dynamic image in the stopped state, and may display the same.

In step 1005, the processor 120 may store the dynamic image displaying the path of the drag input. For example, if an input with respect to the second object 823 providing a function of storing the dynamic image 820 displaying the path 821 of the drag input is received, the processor 120 may store the dynamic image 820 displaying the path 821 of the drag input, as shown in FIG. 8. If the amount of data of the path 821 of the drag input is greater than or equal to a reference value, the processor 120 may automatically store the dynamic image 820 displaying the path 821 of the drag input.

The processor 120 may store the dynamic image 820 displaying the path 821 of the drag input as a separate file from the original file of the dynamic image, as shown in FIG. 8, or may update the dynamic image of the original file with the dynamic image 820 displaying the path 821 of the drag input, and may then store the same. The processor 120 may perform text recognition for the path 821 of the drag input, may determine text corresponding to the path 821 of the drag input, and may use the determined text as a file name of the dynamic image 820 displaying the path 821 of the drag input.

After storing the dynamic image 820 displaying the path 821 of the drag input, the processor 120 may transmit the stored dynamic image 820 to an external electronic device 104 through a communication module 190. For example, after storing the dynamic image 820 displaying the path 821 of the drag input, the processor 120 may receive an input with respect to the first object 822 providing a function of sharing the path 821 of the drag input or the dynamic image 820 displaying the path 821 of the drag input with an external electronic device. In response to the receipt of the input to the first object 822, the processor 120 may provide a screen displaying one or more external electronic devices capable of sharing the dynamic image 820. The processor 120 may transmit the path 821 of the drag input or the dynamic image 820 displaying the path 821 of the drag input to at least one external electronic device selected by the user from among the one or more external electronic devices displayed on the screen.

Figure 11:
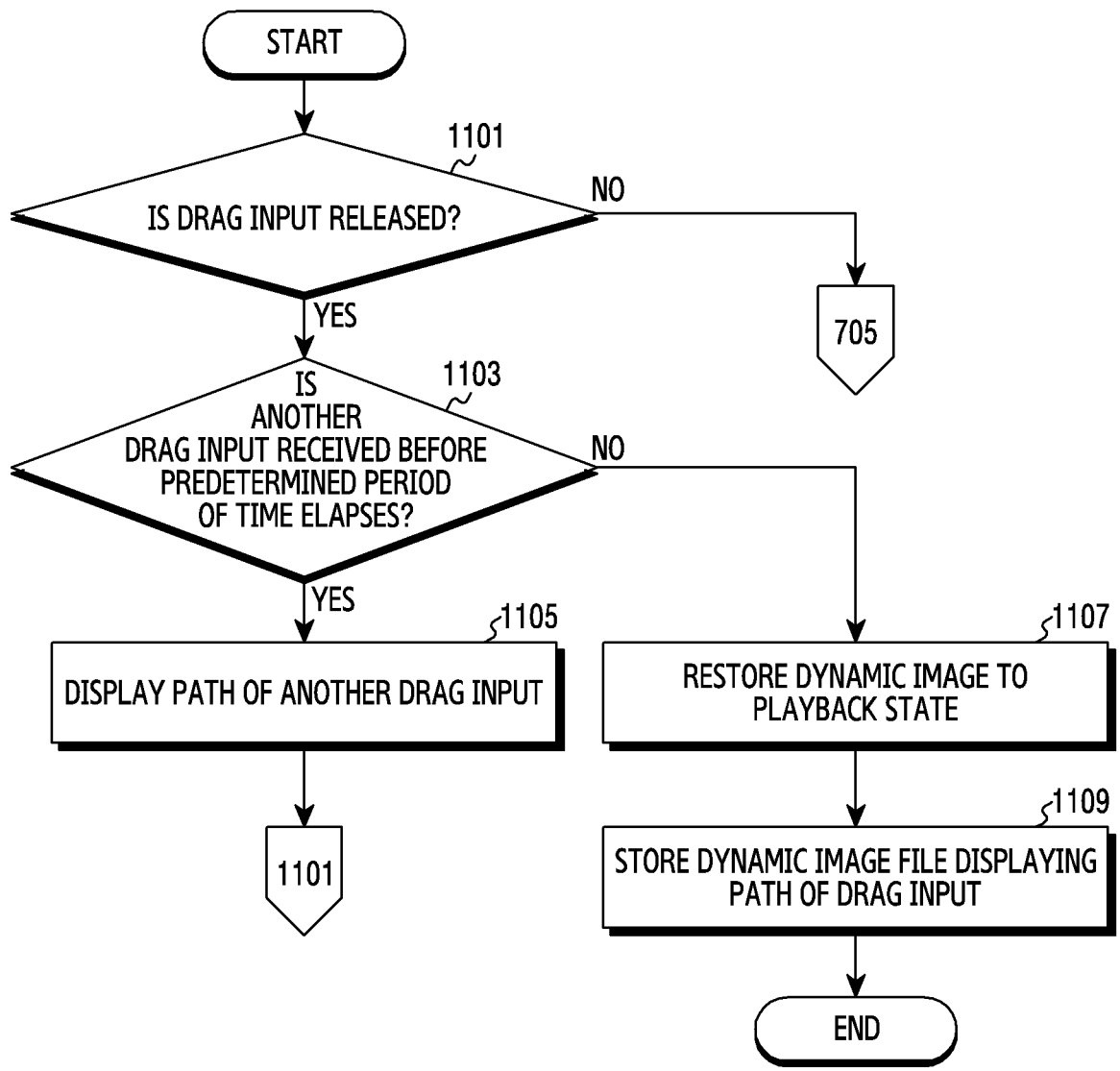
FIG. 11 is a flowchart illustrating a method for storing a dynamic image file displaying a path of a drag input in an electronic device, according to an embodiment.

FIG. 11 is a flowchart illustrating a method for storing a dynamic image file displaying a path of a drag input in an electronic device, according to an embodiment. The following description may correspond to an operation performed after step 705 in FIG. 7.

Referring to FIG. 11, in step 1101, a processor 120 of an electronic device 101 determines whether or not the drag input is released from the dynamic image, which is in the stopped state. If the drag input is released from the dynamic image in the stopped state, the processor 120 performs steps 1103 to 1105. If the drag input is not released from the dynamic image in the stopped state, the processor 120 displays a path of the drag input on the dynamic image in the stopped state as step 705 in FIG. 7.

If the drag input is released from the dynamic image in the stopped state, the processor 120 determines whether or not another drag input is received before a specified period of time (e.g., 10 seconds) elapses in step 1103. The processor 120 may maintain the stopped state of the dynamic image after the time at which the drag input is released and before a specified period of time elapses, or may switch the dynamic image from the playback state to the stopped state at the time at which the drag input is released, and may then display the switched dynamic image. If another drag input is received after the time at which the drag input is released and before a specified period of time elapses, the processor 120 performs step 1105. If another drag input is not received before a specified period of time elapses, the processor 120 performs steps 1107 to 1109.

If another drag input is received before a specified period of time elapses, the processor 120 displays the path of another drag input in step 1105. For example, as shown in FIG. 8, if the drag input is released while the dynamic image 820 displaying the path 821 of the drag input is displayed, and if another drag input is received within a specified period of time, the processor 120 may display the path 831 of another drag input superimposed on the dynamic image 830 in the playback state. If the path 831 of another drag input is displayed, the processor 120 performs step 1101 again in order to determine whether or not the drag input is released.

If another drag input is not received before a specified period of time elapses, the processor 120 restores the dynamic image to the playback state in step 1107. For example, the processor 120 may switch the dynamic image from the playback state to the stopped state at the time at which a specified period of time has elapsed since the drag input was released from the dynamic image in the stopped state, and may then display the switched dynamic image.

In step 1109, the processor 120 stores the dynamic image displaying the path of the drag input. For example, if an input with respect to the second object 823 providing a function of storing the dynamic image 820 displaying the path 821 of the drag input is received, as shown in FIG. 8, the processor 120 may store the dynamic image 820 displaying the path 821 of the drag input. If the amount of data of the path 821 of the drag input is greater than or equal to a reference value, the processor 120 may automatically store the dynamic image 820 displaying the path 821 of the drag input.

The processor 120 may store the dynamic image 820 displaying the path 821 of the drag input as a separate file from the original file of the dynamic image, as shown in FIG. 8, or may update the original file of the dynamic image with the dynamic image 820 displaying the path 821 of the drag input, and may then store the same. The processor 120 may perform text recognition with respect to the path 821 of the drag input, may determine text corresponding to the path 821 of the drag input, and may use the determined text as a file name of the dynamic image 820 displaying the path 821 of the drag input.

After storing the dynamic image 820 displaying the path 821 of the drag input, the processor 120 may transmit the stored dynamic image 820 an external electronic device (e.g., the electronic device 104) through a communication module 190. For example, after storing the dynamic image 820 displaying the path 821 of the drag input, the processor 120 may receive an input with respect to the first object 822 providing a function of sharing the path 821 of the drag input or the dynamic image 820 displaying the path 821 of the drag input with an external electronic device. In response to the receipt of the input to the first object 822, the processor 120 may provide a screen displaying one or more external electronic devices capable of sharing the dynamic image 820. The processor 120 may transmit the path 821 of the drag input or the dynamic image 820 displaying the path 821 of the drag input to at least one external electronic device selected by the user from among the one or more external electronic devices displayed on the screen.

According to various embodiments, a method for processing a dynamic image in an electronic device may include displaying a dynamic image in a stopped state, receiving a drag input onto an area in which the dynamic image is displayed in the stopped state, and displaying a path of the drag input superimposed on the dynamic image, which has been switched from the stopped state to a playback state, while the drag input remains in contact with a display of the electronic device.

The method for processing a dynamic image in an electronic device may further include restoring the dynamic image to the stopped state in response to an operation of identifying that the drag input is released.

The method for processing a dynamic image in an electronic device may further include displaying the dynamic image in the stopped state along with at least one object for controlling the dynamic image, and deactivating the at least one object while the drag input remains in contact with the display.

The method for processing a dynamic image in an electronic device may further include activating the at least one deactivated object in response to the operation of identifying that the drag input is released.

Deactivating the at least one object may include stopping displaying of the at least one object.

The method for processing a dynamic image in an electronic device may further include storing the dynamic image displaying the path of the drag input, which is superimposed on the dynamic image, for a reproduction period in which the drag input remains in contact with the display, among an entire reproduction period of the dynamic image.

The method for processing a dynamic image in an electronic device may further include transmitting the stored dynamic image to another electronic device.

The method for processing a dynamic image in an electronic device may further include, in response to an operation of identifying that the drag input is released, determining whether or not another drag input is received after the drag input is released and before a predetermined period of time elapses, and if another drag input is received before the predetermined period of time elapses, displaying a path of another drag input superimposed on the dynamic image displayed in the playback state while another drag input remains in contact with the display.

According to various embodiments, a method for processing a dynamic image in an electronic device may include displaying a dynamic image in a playback state, receiving a drag input onto an area in which the dynamic image is displayed in the playback state, and displaying a path of the drag input superimposed on the dynamic image, which has been switched from the playback state to a stopped state, while the drag input remains in contact with the display.

The method for processing a dynamic image in an electronic device may further include restoring the dynamic image to the playback state in response to an operation of identifying that the drag input is released.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents

What is claimed is:

1. An electronic device comprising:
   a display;
   at least one processor; and
   a memory operatively connected to the at least one processor,
   wherein the memory stores instructions that cause, when executed, the at least one processor to:
   display a dynamic image in a stopped state,
   receive a drag input with a drawing path onto an area in which the dynamic image is displayed in the stopped state,
   switch the dynamic image from the stopped state to a playback state in which the dynamic image is reproduced at a predefined speed while the drag input is maintained on the area in which the dynamic image is displayed,
   display the drawing path of the drag input superimposed on the dynamic image, which has been switched from the stopped state to a playback state, and
   restore the dynamic image from the playback state to the stopped state in response to the drag input being released from the display or in response to a predetermined period of time having elapsed since the drag input is released from the display.

2. The electronic device of claim 1, wherein the instructions further cause the at least one processor to:
in response to an operation of identifying that the drag input is released, determine whether another drag input is received after the drag input is released and before the predetermined period of time elapses; and
if another drag input is received before the predetermined period of time elapses, display a drawing path of another drag input superimposed on the dynamic image displayed in the playback state while another drag input is maintained on the display.

3. The electronic device of claim 1, wherein a reproduction speed of the dynamic image in the playback state corresponds to a speed of the drag input.

4. The electronic device of claim 1, wherein the instructions further cause the at least one processor to:
in response to an operation of identifying that the drag input is released, restore the dynamic image to the stopped state;
identify text corresponding to the drawing path of the drag input; and
change the drawing path of the drag input superimposed on the dynamic image displayed in the stopped state to the text.

5. The electronic device of claim 1, wherein the instructions further cause the at least one processor to store the dynamic image displaying the drawing path of the drag input, which is superimposed on the dynamic image, for a reproduction period in which the drag input is maintained on the display, among an entire reproduction period of the dynamic image.

6. The electronic device of claim 5, further comprising a communication circuit,
wherein the instructions further cause the at least one processor to transmit the stored dynamic image to another electronic device using the communication circuit.

7. The electronic device of claim 1, wherein the instructions further cause the at least one processor to:
display the dynamic image in the stopped state along with at least one object for controlling the dynamic image; and
deactivate the at least one object while the drag input is maintained on the display.

8. The electronic device of claim 3, wherein the instructions further cause the at least one processor to activate the at least one deactivated object in response to an operation of identifying that the drag input is released.

9. The electronic device of claim 3, wherein the instructions further cause the at least one processor to deactivate the at least one object by stopping displaying of the at least one object.

10. A method for processing a dynamic image in an electronic device, the method comprising:
displaying a dynamic image in a stopped state;
receiving a drag input with a drawing path onto an area in which the dynamic image is displayed in the stopped state;
switching the dynamic image from the stopped state to a playback state in which the dynamic image is reproduced at a predefined speed while the drag input is maintained on the area in which the dynamic image is displayed;
displaying the drawing path of the drag input superimposed on the dynamic image, which has been switched from the stopped state to a playback state; and
restoring the dynamic image from the playback state to the stopped state in response to the drag input being released from the display or in response to a predetermined period of time having elapsed since the drag input is released from the display.

11. The method of claim 10, further comprising:
in response to an operation of identifying that the drag input is released, determining whether another drag input is received after the drag input is released and before the predetermined period of time elapses; and
if another drag input is received before the predetermined period of time elapses, displaying a drawing path of another drag input superimposed on the dynamic image displayed in the playback state while another drag input is maintained on the display.

12. The method of claim 11, further comprising storing the dynamic image displaying the drawing path of the drag input, which is superimposed on the dynamic image, for a reproduction period in which the drag input is maintained on the display, among an entire reproduction period of the dynamic image.

13. The method of claim 12, further comprising transmitting the stored dynamic image to another electronic device.

14. The method of claim 11, further comprising:
displaying the dynamic image in the stopped state along with at least one object for controlling the dynamic image; and
deactivating the at least one object while the drag input is maintained on the display.

15. The method of claim 13, further comprising activating the at least one deactivated object in response to the operation of identifying that the drag input is released.

16. The method of claim 13, wherein deactivating the at least one object comprises stopping displaying the at least one object.

* * * * *